UNITED STATES PATENT OFFICE.

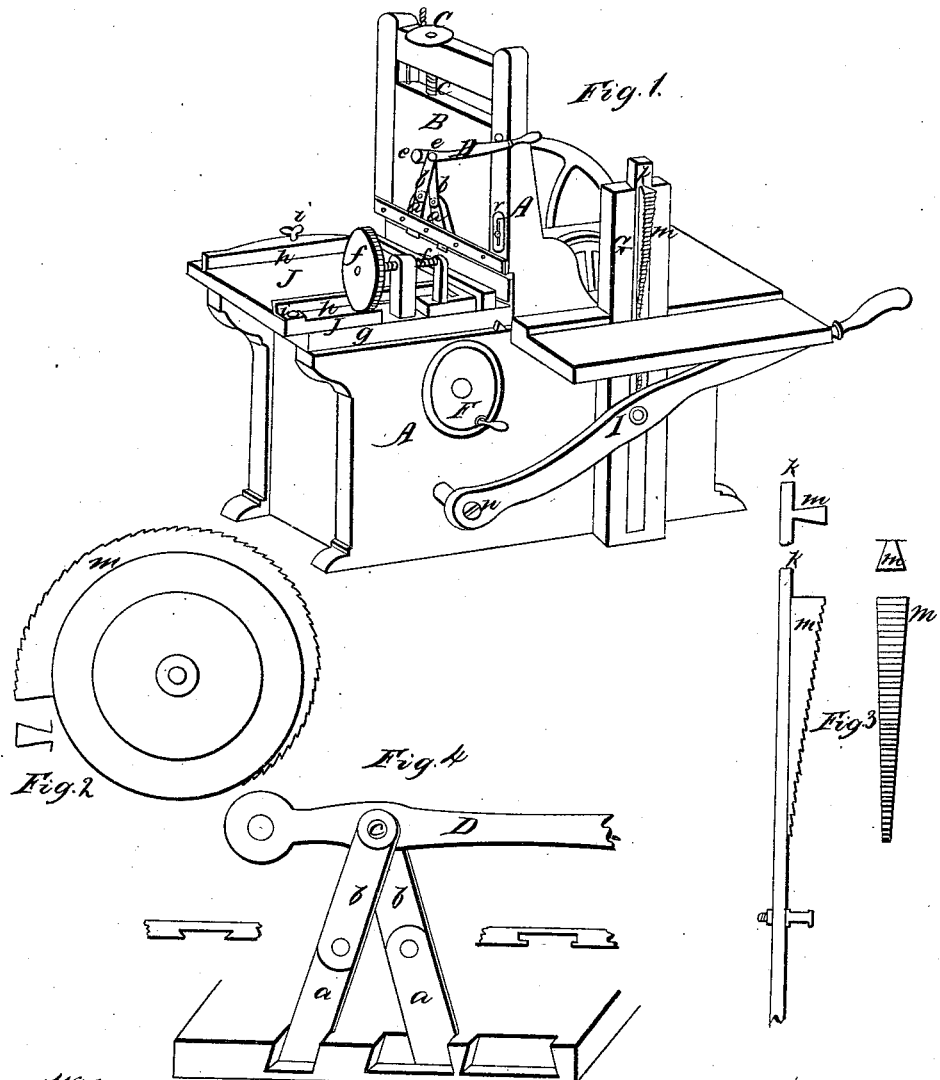

H. WESLEY JELLIFF, OF APPLETON, OHIO.

DOVETAILING-MACHINE.

Specification of Letters Patent No. 28,672, dated June 12, 1860.

*To all whom it may concern:*

Be it known that I, H. WESLEY JELLIFF, of Appleton, in the county of Licking, State of Ohio, have invented a Machine for Dovetailing; and I do hereby declare the following to be a full and exact description of the same, reference herein being had to the drawings which accompany this specification and which form part of the same.
The nature of my invention consists in forming dovetails in a simple and direct manner by means of cutters without complicated machinery.

In the drawings Figure 1 is a perspective view of the whole machine. Fig. 2 is a view of the cutter for the dovetail opening, in a rotary form. Fig. 3 is the same cutter in a straight shape. Fig. 4 is the cutters for forming the dovetail pins.
The same letters refer to the same parts in each figure.

A frame work A holds a sliding gate B which is raised and lowered by means of the screw and wheel C. In this gate two chisels or cutters $a$, $a$, are set in grooves in opposite oblique directions, each cutter being connected with a center pin, $c$, in the lever D, by the rods $b$, $b$. The lever D has its fulcrum at $e$, on the gate B, and is used to give an up and down movement to the oblique cutters $a$, $a$.

On the frame A in front of the gate B is a carriage in two parts, $j$ and $g$, the upper part $j$ being moved to and from the cutters $a$, $a$, by the wheel and screw $f$. The lower part $g$, travels parallel with the face of the cutters and is controlled by the screw (not shown) attached to the hand wheel, F, on the side of the frame A. On the carriage are movable clamps, $h$, $h$, held down by screws $i$, $i$.

To any convenient part of the frame A is secured an upright post G, in which is a groove holding the slide $k$, on which is fastened the angular cutter, $m$, represented in Fig. 3.

This cutter is formed by taking a piece which is of any desired length and of the shape of the pin of the dovetail, cutting it obliquely from the front to the back in the direction of its length and then toothing the surface of its inclined front.

The slide $k$ is attached to the lever I which has its fulcrum at $n$, or the frame A.

The manner of operating is to fasten the piece on which the pins are to be cut between the clamps $h$, $h$, set the gate B to the required height for the piece to pass under the cutters, and by the slotted slide $r$ on the frame A regulate the depth of the cut, then by operating the lever D and at the same time moving the upper part $j$ of the carriage by the screw $f$ carry the stuff under the cutters as far as is needed. When this has been done the upper part $j$ is drawn back and the carriage moved laterally by the wheel F so as to bring the chisel to operate on the side of the dovetail pin yet uncut, and commence another pin at the required distance. And for the open dovetail, the piece is placed in front of the cutter, $m$, on the slide, $k$, and the cutter being drawn through the piece by the lever I forms the open dovetail complete in its passage. If desired, any number can be used and a whole side of a drawer be open dovetailed at once.

The rotary cutter shown in Fig. 2 is only the same cutter in a different form—that is, it is circular instead of straight.

I do not broadly claim oblique or angular cutters, but

What I claim and desire to secure by Letters Patent is—

1. The arrangement of the obliquely cutting chisels $a$, $a$, in combination with the two carriages, $j$ and $g$, and the adjustable gate B.

2. I do not claim the cutter $m$, in Fig. 2, except when arranged and operated substantially as shown and set forth.

H. WESLEY JELLIFF.

Witnesses:
W. M. GOODING,
J. H. POWERS.